United States Patent
Nakatani et al.

(10) Patent No.: US 7,948,746 B2
(45) Date of Patent: May 24, 2011

(54) COVER OPENING/CLOSING DEVICE AND INFORMATION PROCESSING UNIT

(75) Inventors: Hitoshi Nakatani, Osaka (JP); Shintaro Tanaka, Osaka (JP); Haruka Kaneko, Kyoto (JP); Yoshiaki Nagamura, Osaka (JP)

(73) Assignee: Panasonic Corporation, Osaka (JP)

( * ) Notice: Subject to any disclaimer, the term of this patent is extended or adjusted under 35 U.S.C. 154(b) by 108 days.

(21) Appl. No.: 12/551,798

(22) Filed: Sep. 1, 2009

(65) Prior Publication Data

US 2010/0052489 A1 Mar. 4, 2010

(30) Foreign Application Priority Data

Sep. 4, 2008 (JP) ................. 2008-227219

(51) Int. Cl.
*G06F 1/16* (2006.01)
*A47B 88/00* (2006.01)
*A47B 81/00* (2006.01)
*H02G 3/14* (2006.01)
*A47G 29/00* (2006.01)

(52) U.S. Cl. ......... 361/679.33; 361/679.31; 361/679.55; 312/328; 312/223.2; 174/66; 174/67; 220/241; 220/242; 248/694

(58) Field of Classification Search .......... 361/679.01–679.45, 679.55–679.59; 312/223.1, 223.2, 328; 345/156, 157, 168, 345/169; 455/575.1; 174/66, 67; 220/241, 242; 248/694

See application file for complete search history.

(56) References Cited

U.S. PATENT DOCUMENTS

| | | | | |
|---|---|---|---|---|
| 4,298,204 A * | 11/1981 | Jinkins | ......................... | 277/641 |
| 5,613,237 A * | 3/1997 | Bent et al. | ..................... | 455/351 |
| 6,646,864 B2 * | 11/2003 | Richardson | ................ | 361/679.3 |
| 6,983,130 B2 * | 1/2006 | Chien et al. | .................. | 455/90.3 |
| 7,228,984 B2 * | 6/2007 | Tack et al. | ................... | 220/259.1 |
| 7,385,808 B2 * | 6/2008 | Hamada et al. | .......... | 361/679.09 |
| 7,436,653 B2 * | 10/2008 | Yang et al. | ............... | 361/679.01 |
| 7,710,714 B2 * | 5/2010 | Rapp et al. | ............... | 361/679.01 |
| 7,733,642 B2 * | 6/2010 | Liou et al. | ................ | 361/679.41 |
| 2005/0224508 A1 | 10/2005 | Tajiri et al. | | |

FOREIGN PATENT DOCUMENTS

JP 2005-302976 A 10/2005

* cited by examiner

*Primary Examiner* — Zachary M Pape
*Assistant Examiner* — Nidhi Desai
(74) *Attorney, Agent, or Firm* — Hamre, schumann, Mueller & Larson, P.C.

(57) ABSTRACT

A cover opening/closing device of the present invention is formed so that a height of a rib to be in contact with a sealing member asymptotically decreases from a shaft toward an edge of a cover opposite to the shaft. With this configuration, the cover can be closed with only a small load imposed on the cover, whereby the operability in the opening/closing of the cover can be improved. Further, air-tightness of a recessed part provided with a disk drive sealed by the cover can be ensured.

4 Claims, 7 Drawing Sheets

COVER OPENING/CLOSING DEVICE AND INFORMATION PROCESSING UNIT

BACKGROUND OF THE INVENTION

1. Field of the Invention

The present invention relates to a cover opening/closing device that supports a cover in such a manner that the cover can be opened/closed. The present invention also relates to an information processing unit having a cover opening/closing device.

2. Description of Related Art

In recent years, the use of mobile equipment such as a notebook computer requiring waterproofness and drip-proofness has increased, with the improvement of the mobile properties. To improve waterproofness and drip-proofness of mobile equipment, techniques are needed to prevent the entry of moisture into interstices between cases or interstices between a cover and a case in mobile equipment. As a technique for preventing moisture from intruding into interstices, for example, the following configuration is provided: a sealing member having a cushioning property made of, for example, foamed urethane, is provided in an interstice, so that the sealing member is sandwiched and compressed by a case or a cover. A case having a waterproof structure is disclosed in JP 2005-302976 A.

FIG. 6 is a perspective view of a conventional information processing device. As shown in FIG. 6, the information processing device includes a first case 101 (first case) and a second case 102 (second case). The first case 101 includes a keyboard 105, a pointing device 106, and the like. The second case 102 includes a liquid crystal display 102a. The first case 101 and the second case 102 are supported by a hinge part 103 so that they can be opened/closed. The first case 101 includes a cover 104.

FIG. 7 shows a state in which the cover 104 is opened. As shown in FIG. 7, the cover 104 is capable of opening/closing a recessed part 116 provided with a disk drive 111, in which a disk-form medium can be loaded/unloaded. The disk drive 111 includes a turntable 113, an optical pickup 114, and the like. The disk drive 111 is provided in the recessed part 116. The recessed part 116 is provided with a rib 112. The turntable 113 is configured to be fit in a circular hole formed in the center of a disk-form medium, so as to hold the disk-form medium. The optical pickup 114 emits laser light toward a recordable face of the disk-form medium fitted on the turntable 113, so that information can be recorded on the recordable face. The optical pickup 114 receives light reflected from the recordable face with use of a light-receiving element, so as to read information recorded on the disk-form medium.

Further, on an inner face of the cover 104, there is provided a sealing member 141 made of an elastic material such as rubber. In the state shown in FIG. 6 in which the cover 104 is closed, the rib 112 sinks into the sealing member 141 while compressing and deforming the sealing member 141. This improves the air-tightness of the recessed part 116, thereby preventing foreign matters such as moisture or dust from adhering to the disk drive 111.

FIG. 8 is a cross-sectional view showing the principal parts of the notebook computer in a state in which the cover 104 is opened. FIG. 9 is a cross-sectional view showing the principal parts of the notebook computer in a state in which the cover 104 is closed. As shown in FIG. 8, the rib 112 is formed so that, in a region facing the cover 104, a height dimension H1 of the rib 112 from a bottom face 111a of the disk drive 111 is substantially uniform in a plane direction of an inner face 104a of the cover 104. Since the rib 112 is formed so as to be parallel with respect to a surface 141a of the sealing member 141 in the closed state as shown in FIG. 9, a degree of the sinking of the rib 112 in the sealing member 141 is substantially uniform in the plane direction of the inner face 104a of the cover 104.

However, with the above-described conventional configuration, when the cover 104 is closed, it is necessary to impose a great load onto the cover 104 so as to compress the sealing member 141. Thus, the operability upon closing cannot be considered excellent.

SUMMARY OF THE INVENTION

It is an object of the present invention to provide a cover opening/closing device that is capable of maintaining air-tightness of a recessed part sealed by a cover, that does not require a great load when the cover is closed, and that can improve the operability when the cover is closed, and to provide an information processing device incorporating the cover opening/closing device.

In order to achieve the above-described object, an essential aspect of the present invention is a cover opening/closing device configured so that when a cover, while pivoting about a shaft, closes an opening part that forms a part surrounding a recessed part provided in a case, a degree of sinking of a rib, which is a degree at which the rib provided upright in the recessed part sinks into the sealing member provided on the cover, decreases from the shaft side toward an edge of the cover opposite to the shaft. Another essential aspect of the present invention is an information processing device having this cover opening/closing device.

A first cover opening/closing device according to the present invention is formed so as to include: a case having an opening part that forms a surrounding of a recessed part; and a cover that is capable of opening/closing the opening part, and has a shaft supported by the case. In the device, the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof. The recessed part has a rib formed at a position such that the rib can sink in the sealing member when the cover main body closes the opening part. Portions of the rib to be engaged with portions of the sealing member positioned in the vicinity of the connecting sides are formed so that a height thereof in a depth direction of the recessed part asymptotically decreases from the shaft side toward the opposite side.

A second cover opening/closing device according to the present invention is formed so as to include: a case having an opening part that forms a surrounding of a recessed part; and a cover that is capable of opening/closing the opening part, and has a shaft supported by the case. In the device, the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof. Portions of the sealing member positioned in the vicinity of the connecting sides are formed so that a thickness thereof in a depth direction of the recessed part asymptotically decreases from the shaft side toward the opposite side.

A first information processing device of the present invention is formed so as to include: a case having an opening part that forms a surrounding of a recessed part, and having a disk drive disposed in the recessed part; and a cover that is capable of opening/closing the opening part, and has a shaft supported by the case. In the device, the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof. The recessed part has a rib formed at a position such that the rib can sink in the sealing member when the cover main body closes the opening part. Portions of the rib to be engaged with portions of the sealing member positioned in the vicinity of the connecting sides are formed so that a height thereof in a depth direction of the recessed part asymptotically decreases from the shaft side toward the opposite side.

A second information processing device according to the present invention is formed so as to include: a case having an opening part that forms a surrounding of a recessed part, and having a disk drive disposed in the recessed part; and a cover that is capable of opening/closing the opening part, and has a shaft supported by the case. In the device, the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof. Portions of the sealing member positioned in the vicinity of the connecting sides are formed so that a thickness thereof in a depth direction of the recessed part asymptotically decreases from the shaft side toward the opposite side.

The present invention makes it possible to decrease a load upon opening/closing, with air-tightness of a recessed part sealed by a cover being maintained Thus, the operability upon closing can be improved.

DETAILED DESCRIPTION OF THE INVENTION

Embodiment

1. Configuration of an Information Processing Device

Figure 1:
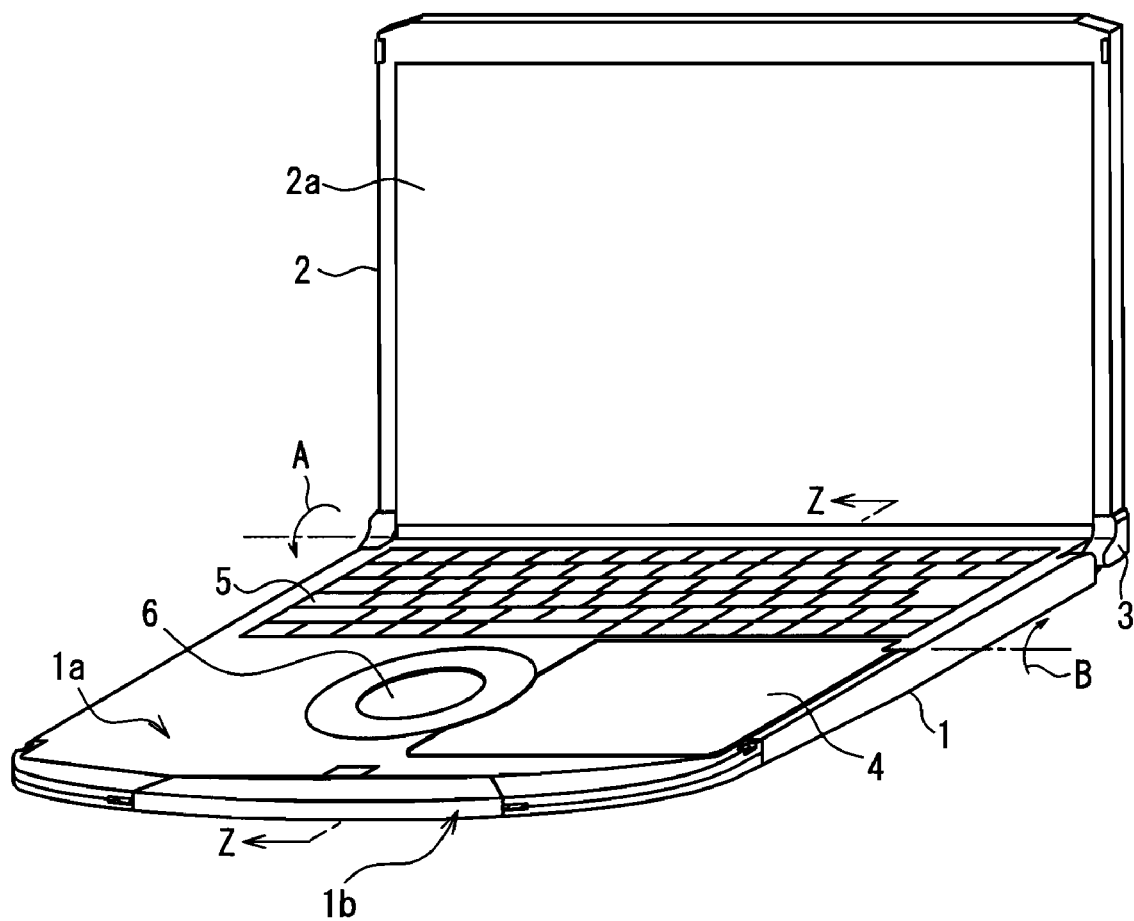
FIG. 1 is a perspective view showing an appearance of an information processing device according to an embodiment of the present invention.
Figure 2:
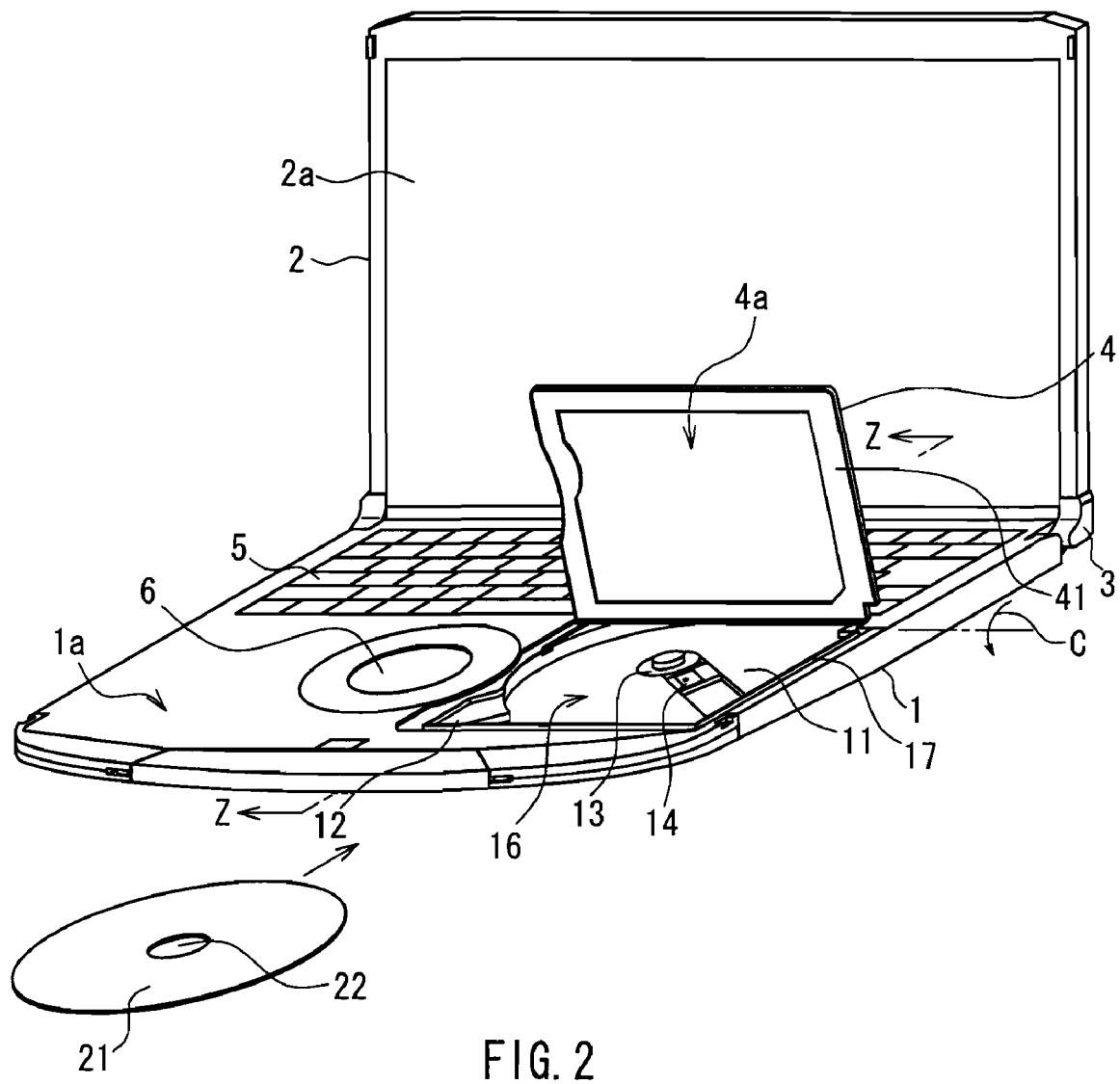
FIG. 2 is a perspective view showing an appearance of an information processing device according to an embodiment of the present invention.
Figure 3:
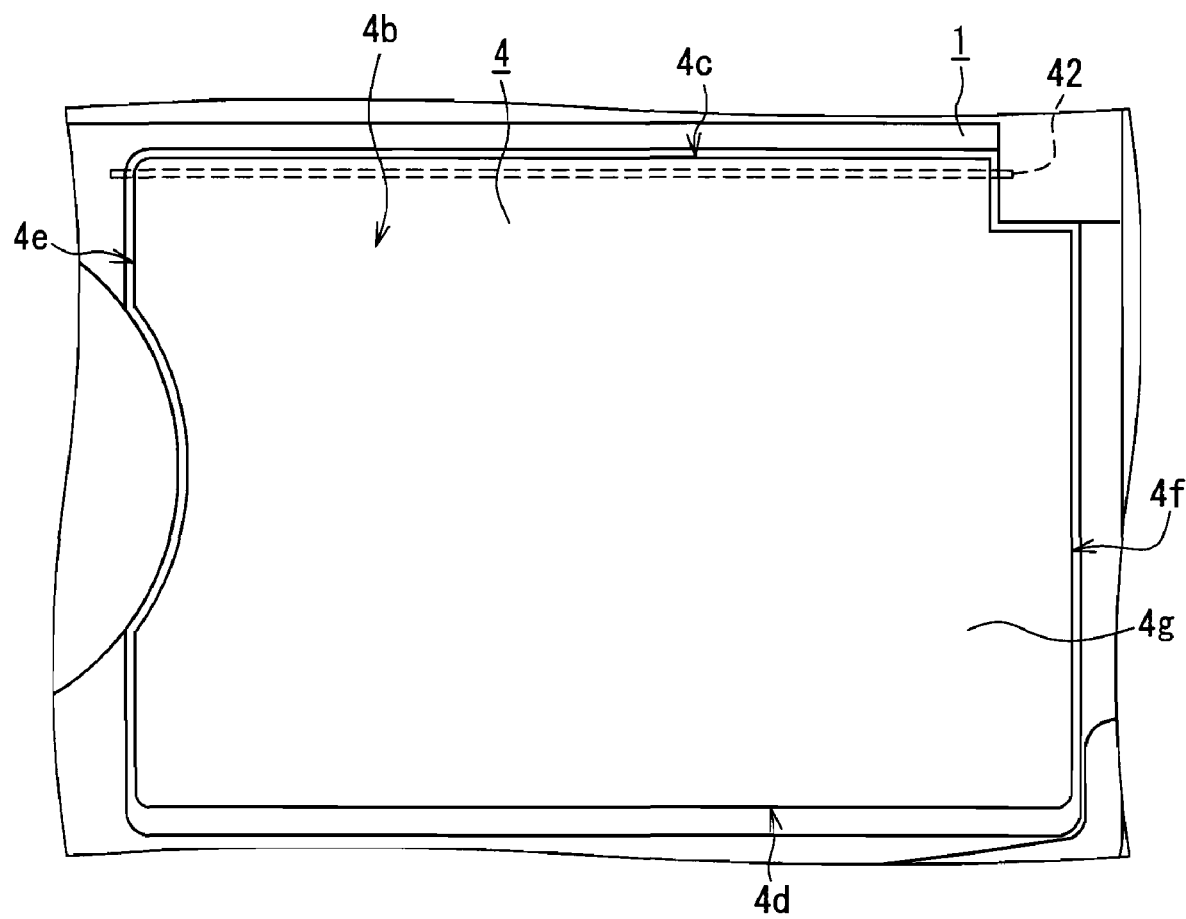
FIG. 3 is a plan view showing vicinities of a cover in a first case.

FIG. 1 is a perspective view showing an appearance of an information processing device according to the present embodiment. FIG. 1 illustrates a first state of a notebook computer as an example of an information processing device. FIG. 2 is a perspective view showing a state of the notebook computer of the present embodiment in which a cover is opened. FIG. 3 is a plan view showing vicinities of the cover in a first case. It should be noted that though the notebook computer is taken as an example of the information processing device of the present embodiment, the information processing device may be anything, such as a mobile telephone terminal or a portable game machine, that has a recessed part incorporating a drive to which, for example, an information medium can be loaded/unloaded and that has a cover that can open/close the recessed part.

As shown in FIG. 1, the notebook computer includes a first case 1 and a second case 2. The first case 1 incorporates a circuit board on which various electric elements are mounted, an information processing circuit, a hard disk drive, etc. The second case 2 includes a liquid crystal display 2a. The first case 1 and the second case 2 are supported by a hinge portion 3 in such a manner that the first and second cases 1 and 2 can pivot about the hinge portion 3. The second case 2 can be caused to pivot from a position (first state) shown in FIG. 1 in a direction indicated by an arrow A, whereby the state of the same shifts to a second state in which the liquid crystal display 2a and a keyboard 5 are opposed, close to each other. If a side of a face of the first case opposed to the second case in the second state is defined as "upper side", the keyboard 5 and a pointing device 6 are provided on an upper side face 1a of the first case 1. With the keyboard 5, an operation of entering various letters can be carried out. With the pointing device 6, an operation of moving a cursor displayed on the liquid crystal display 2a to a desired position can be carried out. It should be noted that an information signal generated according to on an input operation using the keyboard 5, an information signal output from a hard disk drive or the like are subjected to predetermined processing in an information processing circuit, and are converted into a display signal displayed by the liquid crystal display 2a, for example. The upper side face 1a of the first case 1 has a recessed part 16, an opening part 17 forming a part of the recessed part 16, and a cover 4 that is capable of opening/closing the opening part 17.

The cover 4 is supported by the first case 1 in such a manner that the cover 4 can pivot in a direction indicated by an arrow B (FIG. 1) or in a direction indicated by an arrow C (FIG. 2). As shown in FIG. 2, the cover 4 is capable of shifting the disk drive 11 provided in the recessed part 16 of the first case 1 between a state in which the disk drive 11 is exposed and a state in which the disk drive 11 is covered. The "state in which the disk drive 11 is exposed" refers to a state in which the disk drive 11 is at least ready to allow a disk-form medium 21 to be loaded/unloaded on the turntable 13, and is equivalent to a state where the cover 4 has opened the recessed part 1 or the opening part 17. The "state in which the disk drive 11 is covered" refers to a state in which the disk drive 11 is at least not ready to allow the disk-form medium 21 to be loaded/ unloaded on the turntable 13, and is equivalent to a state in which the cover 4 closes the recessed part 16 or the opening part 17.

As shown in FIG. 3, the cover 4 has a shaft side 4c, an opposite side 4d, a connecting side 4e, a connecting side 4f, and a cover main body 4g. The cover main body 4g is capable of covering an entirety or a part of the opening part 17 when the cover 4 is in a closing state. The cover main body 4g is surrounded by the shaft side 4c, the opposite side 4d, the connecting side 4e, and the connecting side 4f. The shaft side 4c is provided in the vicinity of the shaft 42. The opposite side 4d and the shaft side 4c are opposed to each other with the cover main body 4g being interposed therebetween. The connecting sides 4e and 4f connect the shaft side 4c and the opposite side 4d, extending therebetween. The connecting sides 4e and 4f are opposed to each other with the cover main body 4g being interposed therebetween.

The disk drive 11 is provided with the turntable 13, an optical pickup 14, and the like. The disk drive 11 is provided in the recessed part 16. The recessed part 16 is provided with a rib 12. The rib 12 is provided upright on a bottom face 11a of the recessed part 16. The turntable 13 is fit in a round hole 22 formed at the center of the disk-form medium 21, so as to hold the disk-form medium 21. The optical pickup 14 emits laser light to a recording surface of the disk-form medium 21 loaded on the turntable 13, so as to record information onto a recording surface. The optical pickup 14 emits laser light to a recording surface of the disk-form medium 21, and receives light reflected from the recording surface using a light-receiving element, so as to read information recorded in the disk-form medium 21.

2. Configuration of a Cover Opening/Closing Device

As shown in FIG. 2, an inner face 4a of the cover 4a is provided with a sealing member 41. The sealing member 41 is arranged in a peripheral portion and the vicinities of the same on the inner face 4a of the cover 4. In the present embodiment, the sealing member 41 is positioned, on the inner face 4a, along the shaft side 4c, the opposite side 4d, the connecting side 4e, and the connecting side 4f. Examples of a material applied for forming the sealing member 41 include elastic materials such as rubber, foamed resins that are deformed by compression and are restorable therefrom, such as foamed urethane, foamed polyethylene, silicone foam, and the like. In the present embodiment, a silicone foam having a thickness of 1 mm, which is characterized in that a load for 25% compression measured by a method according to the regulations of Japanese Industrial Standards (JIS) K 6254 was 0.040 MPa, is used. The sealing member 41 is disposed at a position such that the sealing member 41 is in contact with, or sinks in, the rib 12 when the cover 4 closes the opening part 17, as shown in FIG. 1. The rib 12 is in contact with, or sinks in, the sealing member 41 when the cover 4 closes the opening part 17, thereby causing the air-tightness of the disk drive 11 to be improved, so that foreign matter such as moisture or dust is prevented from intruding into the disk drive 11. Further, the rib 12 sinking in the sealing member 41 ensures the air-tightness of the disk drive 11, even if the height dimension of the rib 12 and the thickness of the sealing member 41 have some variation upon production.

Figure 4:
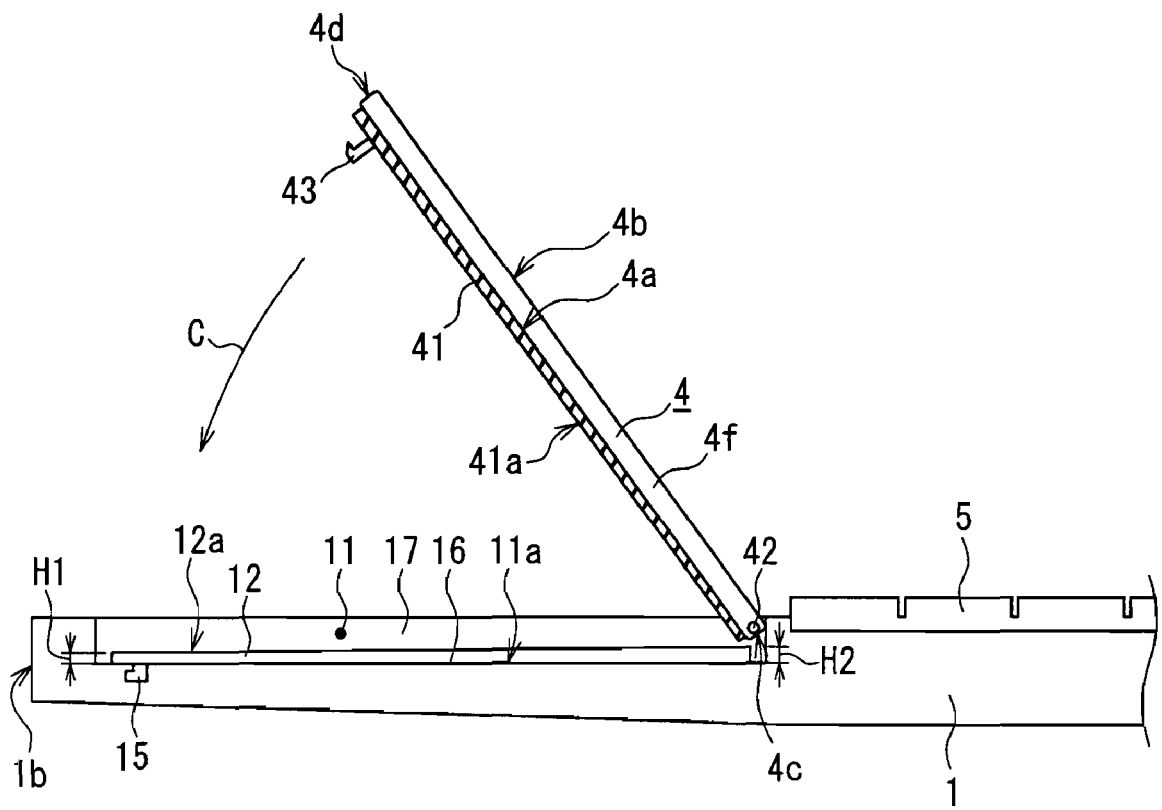
FIG. 4 is a cross-sectional view taken along a line Z-Z in FIG. 2.
Figure 5:
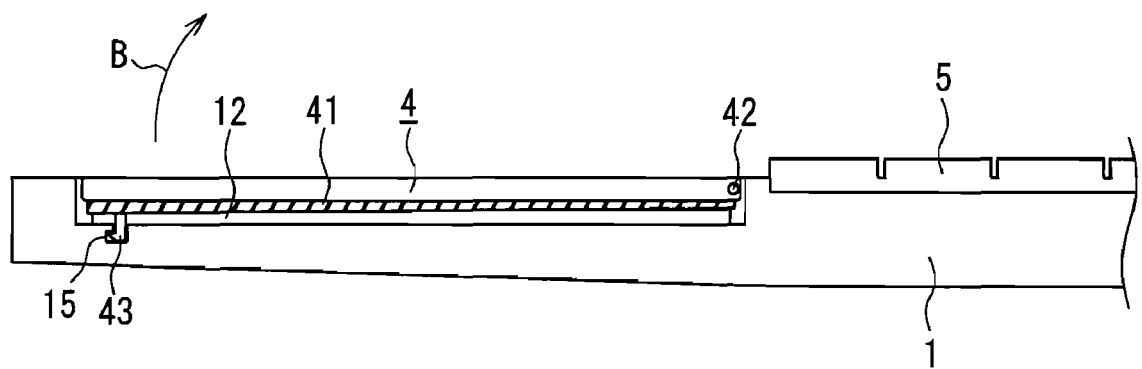
FIG. 5 is a cross-sectional view taken along a line Z-Z in FIG. 1.
Figure 6:
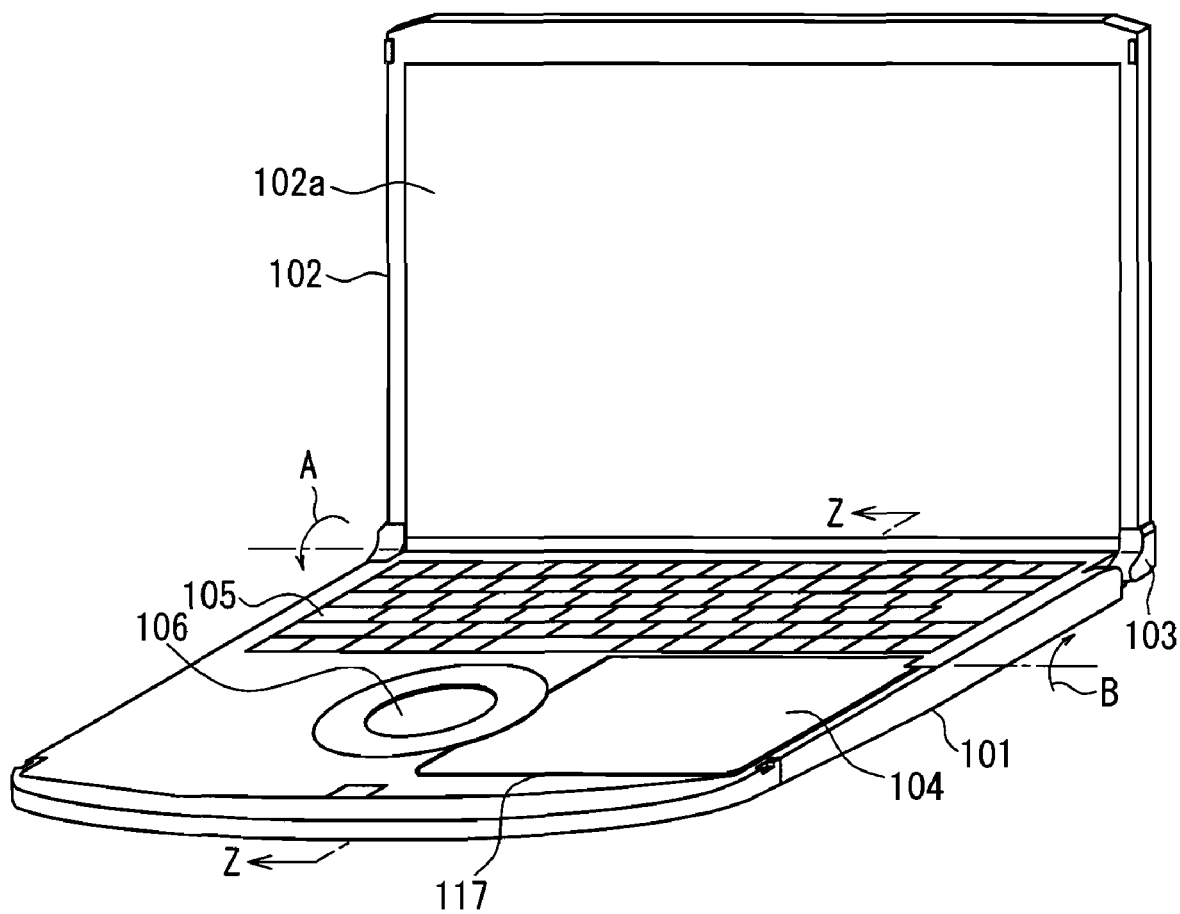
FIG. 6 is a perspective view of a conventional information processing device.
Figure 7:
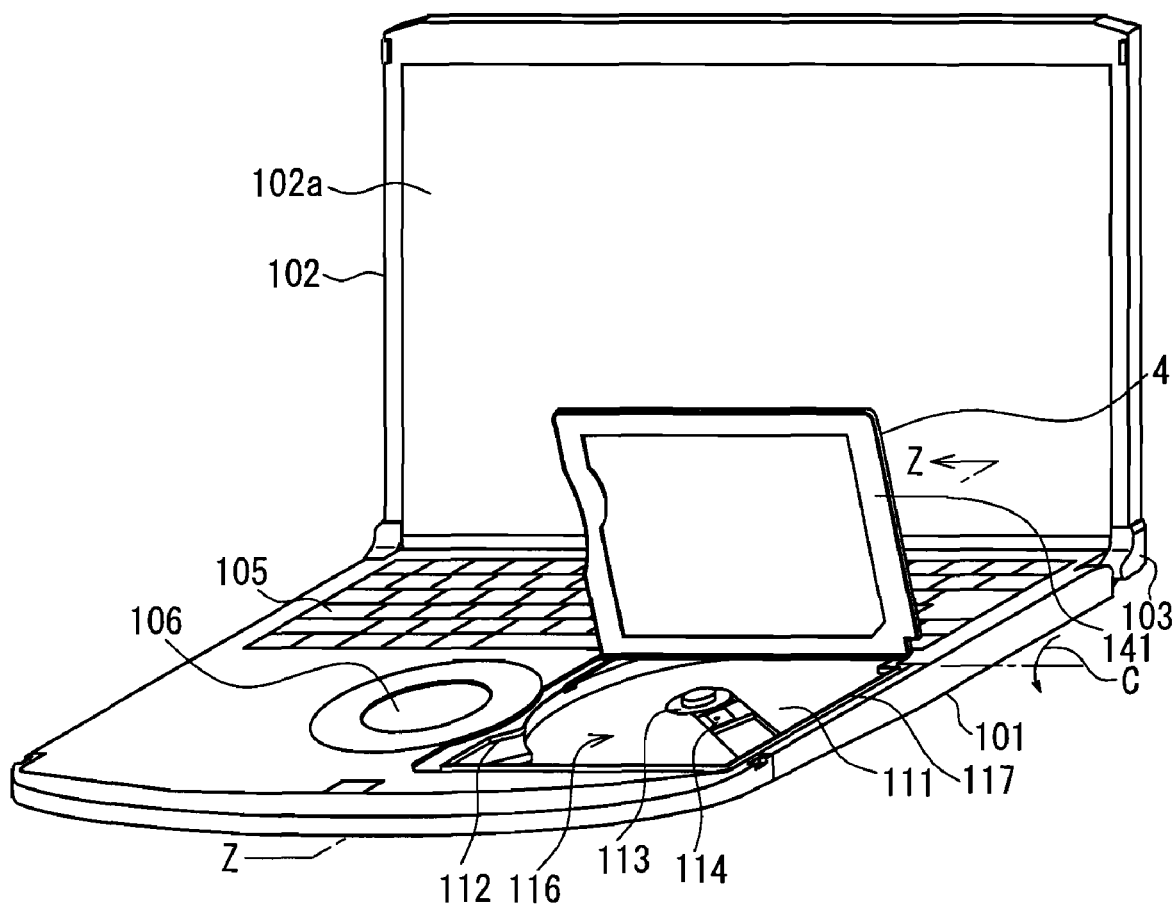
FIG. 7 is a perspective view of a conventional information processing device.

FIG. 4 is a cross-sectional view of principal parts of the notebook computer taken along a line Z-Z shown in FIG. 2. FIG. 5 is a cross-sectional view of principal parts of the notebook computer taken along a line Z-Z shown in FIG. 1. It should be noted that in FIGS. 4 and 5, illustrations of an electric circuit board and the like incorporated in the first case 1 are omitted, for the clarification of the drawings.

As shown in FIGS. 4 and 5, the cover 4 is supported by the first case 1 in such a manner that the cover can pivot in a direction indicated by an arrow B or in a direction indicated by an arrow C about a shaft 42 as an axis. The cover 4 has a size sufficient to cover the opening part 17 of the first case 1. The cover 4 has the sealing member 41 at a position along with an edge of the inner face 4a.

The rib 12 is formed so as to surround an outer circumference of the disk drive 11, as shown in FIG. 2. The rib 12 is formed so that when the cover 4 is present at a position such that the cover 4 closes the opening part 17, a top edge 12a thereof is not parallel with an inner face 4a of the cover 4. More specifically, as shown in FIG. 4, portions of the rib 12 positioned in the vicinities of the connecting sides 4e and 4f are formed in such a manner that a height dimension H1 thereof from the bottom face 11a on a recessed portion 15 (described later) side (i.e., on the opposite side 4d side) is smaller than a height dimension H2 thereof from the bottom face 11a on the shaft 42 side (i.e., on the shaft side 4c side). A portion of the rib 12 extending from an end thereof on a side face 1b side (i.e., on the opposite side 4d side) to an end thereof on the shaft 42 side is formed so as to have a height asymptotically decreasing from the shaft 42 side to the recessed portion 15 side.

It should be noted that in the present embodiment, "the shaft 42 side" also implies "the shaft side 4c side", and can be reworded into "the shaft side 4c side". Further, "the recessed portion 15 side" and "the side face 1b side" also imply "the opposite side 4d side", and can be reworded into "the opposite side 4d side".

In the vicinity of the opposite side 4d on the inner face 4a of the cover 4, a lug 43 is formed. The lug 43 can be engaged in the recessed portion 15 formed in the bottom face 11a of the disk drive 11. The lug 43 engaged in the recessed portion 15 allows a position of the cover 4 in a state of closing the opening part 17 to be maintained.

Next, the following describes an operation for closing the opening part 17 with the cover 4 so as to cover the disk drive 11.

First, in the state in which the cover 4 is opened as shown in FIG. 4, the sealing member 41 and the rib 12 are separated from each other. In this state, an upper face 4b of the cover 4 is pressed, and the cover 4 is caused to pivot in a direction indicated by an arrow C around the shaft 42. Here, the rib 12, from an end on the shaft 42 side thereof, becomes in contact with the sealing member 41, and sinks in the sealing member 41. Thereafter, with a further pivoting action of the cover 4 in the direction indicated by the arrow C, the sealing member 41 gradually sinks toward the side face 1b, with respect to the rib 12, thereby becoming compressed and deformed.

When the cover is caused to pivot to a position shown in FIG. 5, the lug 43 is engaged in the recessed portion 15. Here, the rib 12 and the sealing member 41 are in contact with each other throughout the entirety, and the rib 12 sinks in the sealing member 41, compressing and deforming the same. Thus, the air-tightness of the disk drive 11 is ensured, which makes it possible to prevent foreign matter such as moisture or dust from intruding from the outside.

It should be noted that in the present embodiment the rib 12 is formed so that an end on the shaft 42 side is highest (dimension H2). Therefore, a degree of the sinking of the rib 12 in the sealing member 41 when the cover 4 closes the opening part 17 is largest on the shaft 42 side. As a result, the pivoting action of the cover 4 in the direction indicated by the arrow C has a great resistance with respect to the cover 4 at an initial stage. However, since the rib 12 is formed so as to have a height gradually decreasing toward the recessed portion 15 side, a degree of the sinking of the rib 12 in the sealing member 41 gradually decreases toward the recessed portion 15 side (dimension H1). In the disk drive 11 in the present embodiment, a degree of the sinking of the rib 12 in the sealing member 41 preferably is such that the dimension H2 on the shaft 42 side is not less than 0.6 mm and not more than 0.7 mm, and the dimension H1 on the recessed portion 15 side is not less than 0 mm and not more than 0.1 mm. In the present embodiment, the dimension H2 on the shaft 42 side and the dimension H1 on the recessed portion 15 side are set to 0.7 mm and 0.1 mm, respectively.

Figure 8:
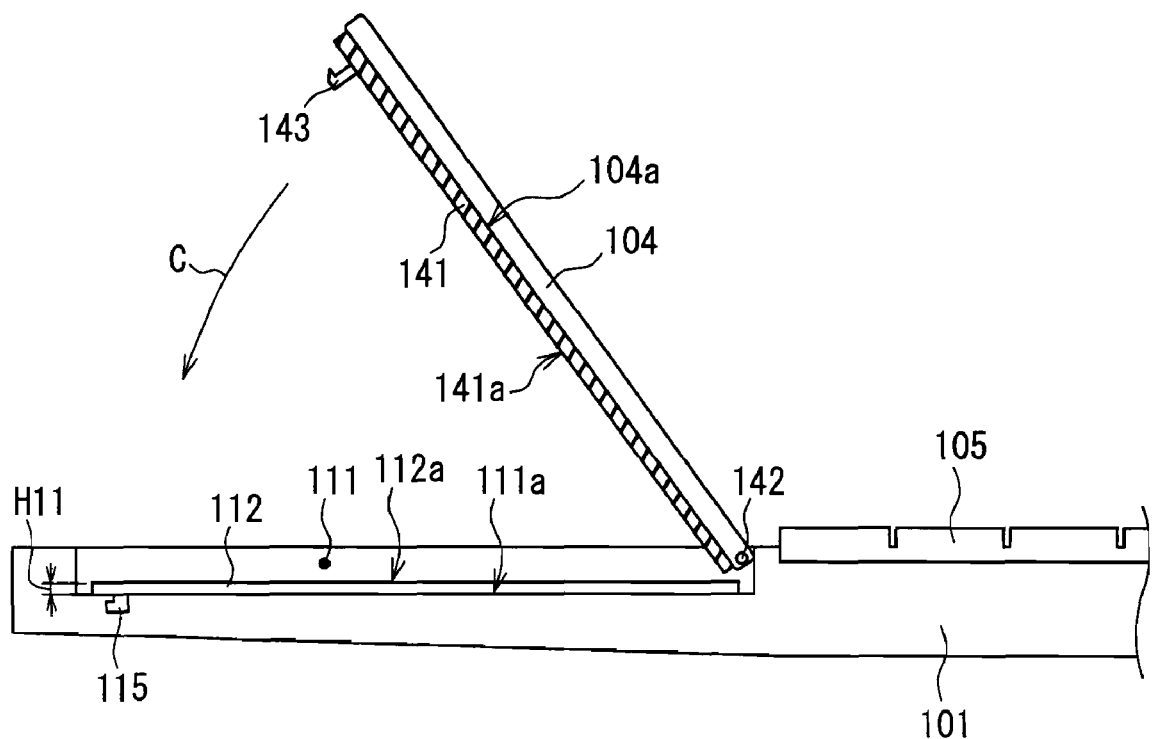
FIG. 8 is a cross-sectional view taken along a line Z-Z in FIG. 7.
Figure 9:
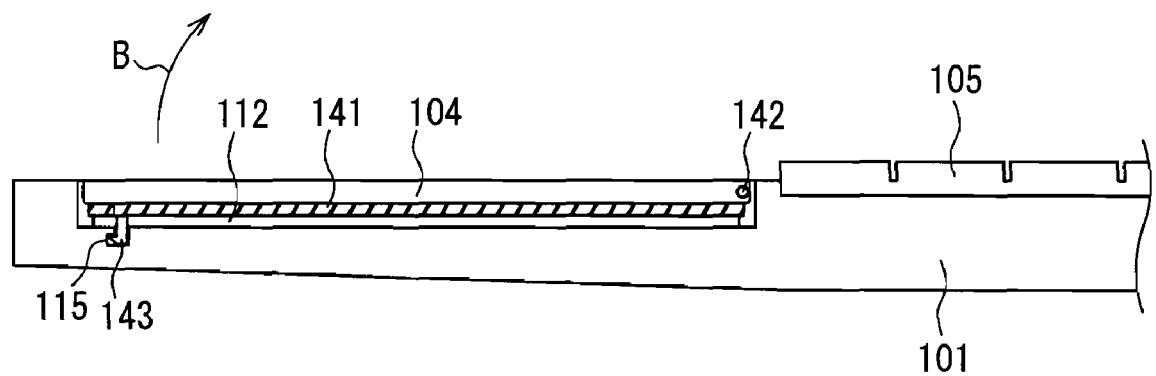
FIG. 9 is a cross-sectional view taken along a line Z-Z in FIG. 6.

3. Comparison Between the Cover Opening/Closing Device in the Present Embodiment and the Conventional Cover Opening/Closing Device As shown in FIGS. 8 and 9, in a configuration in which a degree of the sinking of the rib 112 in the sealing member 141 is uniform in the plane direction of the inner face 104a of the cover 104, the purpose of ensuring an operability when the cover 104 is closed may be effected by a decrease in a degree of the sinking of the rib 112 in the sealing member 141. However, if the degree of the sinking is decreased, the air-tightness of the recessed part 116 provided with the disk drive 111 cannot be ensured in some cases. Particularly when the height dimension H11 of the rib 112 from the bottom face 111a of the disk drive 111 and the thickness dimension of the sealing member 141 vary, there might be a gap between the rib 112 and the sealing member 141 when the cover 104 is closed as shown in FIG. 9, and the air-tightness of the recessed part 116 provided with the disk drive 111 cannot be ensured. Thus, in the case of the cover opening/closing device shown in FIGS. 8 and 9, it is difficult to achieve both of the air-tightness of the recessed part 116 provided with the disk drive 111 and the operability of the cover 104 when it is closed.

Further, as shown in FIGS. 8 and 9, in the cover opening/closing device configured so that the degree of the sinking of the rib 112 in the sealing member 141 is uniform in the plane direction of the inner face 104a, a strong elastic restoring force in a direction indicated by an arrow B is exerted onto the cover 104 when the cover 104 closes the opening part 117 as shown in FIG. 9. Therefore, a heavy load is imposed on an engaging portion between the lug 143 and the recessed portion 115 and on the shaft 142, and in the worst case, the lug 143 and the shaft 142 are damaged.

Since particularly the cover 104 is in the state in which it closes the opening part 117 as shown in FIG. 5 most of the time, except when a disk-form medium is loaded or unloaded with respect to the disk drive 111, a heavy load remains imposed on the lug 143 and the shaft 142 for a long time. Therefore, there is a high possibility that the lug 143 and the shaft 142 are damaged or the cover 104 is deformed.

In contract, in the cover opening/closing device of the present embodiment, as shown in FIGS. 4 and 5, the degree of the sinking of the rib 12 in the sealing member 41 on the shaft 42 side is made smaller than a degree of the sinking of the rib 12 in the sealing member 41 on the recessed portion 15 side. Further, in a state in which the cover 4 closes the opening part 17 as shown in FIG. 5, the elastic restoring force imposed on the cover 4 is decreased. With this, the load imposed on the lug 43 and the shaft 42 in a state in which the cover 4 closes the opening part 17 can be reduced. Therefore, it is possible to reduce damages to the lug 43 and the shaft 42, and the deformation of the cover 4.

Further, in the cover opening/closing device of the present embodiment, as shown in FIG. 5, only the top edge 12a of the rib 12 is in contact with the surface 41a of the sealing member 41 when the cover 4 closes the opening part 17. In other words, the rib 12 merely slightly sinks in the sealing member 41. Therefore, the resistance in the pivoting action of the cover 4 is small. Thus, at the point in time when the lug 43 and the recessed portion 15 are engaged, only a small force for pressing the cover 4 is required.

4. Effects of Embodiment, Etc.

According to the present embodiment, the height of the rib 12 in contact with the sealing member 41 is set so as to decrease asymptotically toward the side face 1b. With this configuration, the cover 4 can be closed with a smaller load imposed on the cover 4, whereby the operability when the cover 4 is closed can be improved.

Further, when the cover 4 closes the opening part 17, the rib 12 sinks in the sealing member 41. Therefore, the air-tightness of the recessed part 16 sealed by the cover 4 can be ensured.

Still further, when the cover 4 closes the opening part 17, the rib 12 sinks in the sealing member 41, whereby an elastic restoring force of the sealing member 41 imposed on the cover 4 can be decreased. Thus, the load on the engaging portion of the lug 43 and the recessed portion 15 or on the shaft 42 can be decreased Thus, damages to the lug 43 and the shaft 42 can be reduced.

It should be noted that in the present embodiment, in order that the degree of the sinking of the rib 12 in the sealing member 41 is varied with the pivoting action of the cover 4, the rib 12 is highest on the shaft 41 side, and is lowest on the side face 1b side. However, this configuration may be modified so that and the thickness of the sealing member 41 is varied while the height of the rib 12 is set uniform. In this case, the sealing member 41 is formed so as to asymptotically become thinner from the shaft 42 toward an edge (the opposite side 4d) of the cover 4 on the side opposite to the shaft 42. With this configuration, the same effect as that of the present embodiment can be achieved.

Still further, in the present embodiment, the portion of the rib 12 extending from an end thereof on the recessed portion 15 side to an end thereof on the shaft 42 side is formed so as to asymptotically become lower from the shaft 42 side to the recessed portion 15 side, but this configuration may be modified so that the foregoing portion may be formed so as to asymptotically become lower from the recessed portion 15 side to the shaft 42 side. In such a configuration, with the height dimension of the rib 12 on the recessed portion 15 side being set to the dimension H2 in FIG. 4, and the height dimension thereof on the shaft 42 side being set at H1 in FIG. 4, the force imposed on the cover 4 in the cover opening direction (indicated by the arrow B) owing to the elastic restoring force of the sealing member 41 in the state where the cover 4 closes the opening part 17 is substantially the same as that in the configuration of the present embodiment. Therefore, the same effect as that of the present embodiment can be achieved.

It should be noted that in the present embodiment, the silicone foam having a thickness of 1 mm is used as the sealing member 41, and the degree of the sinking is set at 0.7 mm on the shaft 42 side and at 0.1 mm in the vicinity of the recessed portion 15. However, these may be set appropriately according to the size of an object to which these are applied, the mechanical strengths of the cover 4 and the shaft 42, and the like.

Further, though the configuration of the cover 4 covering the disk drive 11 is described as the present embodiment, the present invention is not only applicable to a disk drive, but may be applied to anything recessed that can be covered with a cover. For example, the present invention may be applied to a cover structure that incorporates various input/output terminals in a recessed part and that opens/closes the recessed part, or a cover structure for opening/closing a recessed part capable of housing a battery. In other words, the disk drive 11 in the present embodiment is an example of the recessed part in the present invention.

Still further, the recessed part 16 in the present embodiment is an example of the recessed part in the present invention. The opening part 17 in the present embodiment is an example of the opening part in the present invention. The first case 1 in the present embodiment is an example of the case in the present invention. The cover 4 in the present embodiment is an example of the cover in the present invention. The rib 12 in the present embodiment is an example of the rib in the present invention. The cover main body 4g in the present embodiment is an example of the cover main body in the present invention. The shaft side 4c in the present embodiment is an example of the shaft side in the present invention. The opposite side 4d in the present embodiment is an example of the opposite side in the present invention. The connecting sides 4e and 4f in the present embodiment are examples of the connecting sides in the present invention.

The cover opening/closing device of the present invention is useful for equipment having a recessed part that can be opened/closed with a cover. The cover opening/closing device of the present invention is useful for an information processing device such as a notebook computer. The information processing device of the present invention is useful for, for example, a notebook computer.

The following notes are disclosed regarding the present embodiment.

[Note 1]

A cover opening/closing device, comprising:

a case having an opening part that forms a surrounding of a recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, the recessed part has a rib formed at a position such that the rib can sink in the sealing member when the cover main body closes the opening part, and portions of the rib to be engaged with portions of the sealing member positioned in the vicinity of the connecting sides are formed so that a height thereof in a depth direction of the recessed part asymptotically decreases from the shaft side toward the opposite side.

[Note 2]

A cover opening/closing device, comprising:

a case having an opening part that forms a surrounding of a recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, and portions of the sealing member positioned in the vicinity of the connecting sides are formed so that a thickness thereof in a depth direction of the recessed part asymptotically decreases from the shaft side toward the opposite side.

[Note 3]

An information processing device, comprising:

a case having an opening part that forms a surrounding of a recessed part, and having a disk drive disposed in the recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, the recessed part has a rib formed at a position such that the rib can sink in the sealing member when the cover main body closes the opening part, and portions of the rib to be engaged with portions of the sealing member positioned in the vicinity of the connecting sides are formed so that a height thereof in a depth direction of the recessed part asymptotically decreases from the shaft side toward the opposite side.

[Note 4]

An information processing device, comprising:

a case having an opening part that forms a surrounding of a recessed part, and having a disk drive disposed in the recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, and portions of the sealing member positioned in the vicinity of the connecting sides are formed so that a thickness thereof in a depth direction of the recessed part asymptotically decreases from the shaft side toward the opposite side.

What is claimed is:

1. A cover opening/closing device, comprising:

a case having an opening part that forms a surrounding of a recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, the recessed part has a rib formed at a position such that the rib can sink in the sealing member when the cover main body closes the opening part, and portions of the rib to be engaged with portions of the sealing member positioned in the vicinity of the connecting sides are formed so that a height thereof in a depth direction of the recessed part asymptotically decreases from the shaft side toward the opposite side.

2. A cover opening/closing device, comprising:

a case having an opening part that forms a surrounding of a recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, and portions of the sealing member positioned in the vicinity of the connecting sides are formed so that a thickness thereof in a depth direction of the recessed part asymptotically decreases from the shaft side toward the opposite side.

3. An information processing device, comprising:

a case having an opening part that forms a surrounding of a recessed part, and having a disk drive disposed in the recessed part; and a cover that is capable of opening/closing the opening part, and has a shaft supported by the case, wherein the cover has a cover main body capable of covering at least apart of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, the recessed part has a rib formed at a position such that the rib can sink in the sealing member when the cover main body closes the opening part, and portions of the rib to be engaged with portions of the sealing member positioned in the vicinity of the connecting sides are formed so that a height thereof in a depth direction of the recessed part asymptotically decreases from the shaft side toward the opposite side.

4. An information processing device, comprising:

a case having an opening part that forms a surrounding of a recessed part, and having a disk drive disposed in the recessed part; and a cover that is capable of opening/closing the opening part, and has a shaft supported by the case, wherein the cover has a cover main body capable of covering at least a part of the opening part; a shaft side in the vicinity of the shaft; an opposite side that is opposite to the shaft side with the cover main body being interposed therebetween; connecting sides that connect the shaft side and the opposite side; and a sealing member arranged on a peripheral portion of the cover main body and a vicinity thereof, and portions of the sealing member positioned in the vicinity of the connecting sides are formed so that a thickness thereof in a depth direction of the recessed part asymptotically decreases from the shaft side toward the opposite side.

* * * * *

UNITED STATES PATENT AND TRADEMARK OFFICE
CERTIFICATE OF CORRECTION

| | |
|---|---|
| PATENT NO. | : 7,948,746 B2 |
| APPLICATION NO. | : 12/551798 |
| DATED | : May 24, 2011 |
| INVENTOR(S) | : Nakatani et al. |

It is certified that error appears in the above-identified patent and that said Letters Patent is hereby corrected as shown below:

Column 11, line 29 (claim 3): "apart" should read --a part--

Signed and Sealed this
Eighth Day of November, 2011

David J. Kappos
*Director of the United States Patent and Trademark Office*